US011318955B2

(12) United States Patent
Aggarwal et al.

(10) Patent No.: US 11,318,955 B2
(45) Date of Patent: May 3, 2022

(54) MODALITIES FOR AUTHORIZING ACCESS WHEN OPERATING AN AUTOMATED ASSISTANT ENABLED VEHICLE

(71) Applicant: Google LLC, Mountain View, CA (US)

(72) Inventors: Vikram Aggarwal, Palo Alto, CA (US); Moises Morgenstern Gali, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 180 days.

(21) Appl. No.: 16/613,266

(22) PCT Filed: Feb. 28, 2019

(86) PCT No.: PCT/US2019/020145
§ 371 (c)(1),
(2) Date: Nov. 13, 2019

(87) PCT Pub. No.: WO2020/176111
PCT Pub. Date: Sep. 3, 2020

(65) Prior Publication Data
US 2020/0339142 A1 Oct. 29, 2020

(51) Int. Cl.
B60W 50/10 (2012.01)
G06F 21/30 (2013.01)
(Continued)

(52) U.S. Cl.
CPC .......... B60W 50/10 (2013.01); G06F 21/305 (2013.01); G06F 21/34 (2013.01); G10L 15/22 (2013.01);
(Continued)

(58) Field of Classification Search
None
See application file for complete search history.

(56) References Cited

U.S. PATENT DOCUMENTS 9,098,467 B1  8/2015 Blanksteen et al.
2004/0252013 A1 12/2004 Fuks et al.
(Continued)

FOREIGN PATENT DOCUMENTS

DE  102017207038   10/2019
EP       0472356    2/1992
(Continued)

OTHER PUBLICATIONS

European Patent Office, International Search Report and Written Opinion of Ser No. PCT/US2019/020145, 14 pages, dated Nov. 22, 2019.

Primary Examiner — Stella L. Woo
(74) Attorney, Agent, or Firm — Middleton Reutlinger

(57) ABSTRACT

Implementations relate to enabling of authorization of certain automated assistant functions via one or more modalities available within a vehicle. Implementations can eliminate wasting of computational and communication resources by at least allowing other users to authorize execution of certain input commands from a user, without requesting the user to re-submit the commands. The vehicle can include a computing device that provides access to restricted data, which can be accessed in order for an action to be performed by the automated assistant. However, when a restricted user requests that the automated assistant perform an action involving accessing the restricted data, the automated assistant can be authorized or unauthorized to proceed with fulfilling the request via a modality controlled by an unrestricted user. The unrestricted user can also cause contextual restrictions to be established for limiting functionality of the automated assistant during a trip, for certain types of requests, and/or for certain passengers.

18 Claims, 7 Drawing Sheets

(51) Int. Cl.
     *G06F 21/34*          (2013.01)
     *G10L 15/22*          (2006.01)
     *G10L 15/26*          (2006.01)

(52) U.S. Cl.
     CPC ........ *G10L 15/26* (2013.01); *G10L 2015/228* (2013.01)

(56) References Cited

U.S. PATENT DOCUMENTS

| | | |
|---|---|---|
| 2011/0137520 A1 | 6/2011 | Rector et al. |
| 2016/0336009 A1 | 11/2016 | Takei et al. |
| 2018/0060599 A1* | 3/2018 | Horling ................ H04L 63/105 |
| 2018/0357438 A1* | 12/2018 | Gayton ................ G01C 21/00 |
| 2019/0057703 A1* | 2/2019 | Zeinstra ................ G10L 15/30 |

FOREIGN PATENT DOCUMENTS

| | | |
|---|---|---|
| EP | 3470276 | 4/2019 |
| KR | 101930462 | 12/2018 |

\* cited by examiner

MODALITIES FOR AUTHORIZING ACCESS WHEN OPERATING AN AUTOMATED ASSISTANT ENABLED VEHICLE

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input.

Automated assistants can be integrated into a variety of electronic devices, including vehicles. Unlike other computing devices such as mobile phones, vehicles are generally in motion over a large area, and thus are more susceptible to bandwidth restrictions during communications with an outside server. This can in part result from the vehicle moving through areas that do not provide adequate network coverage. This can negatively affect automated assistant operations, which may involve multiple round trips between a vehicle computing device and a remote server.

Automated assistants may have access to publicly-available data as well as user-specific data, which can be associated with a personal user account served by the automated assistant. An automated assistant serving multiple users may have multiple accounts with different data available for each account. Furthermore, while the automated assistant is serving one account, the automated assistant may not have access to the user-specific data of another account. Thus, if one user makes a request to an automated assistant, and responding to the request involves accessing a second user account, the automated assistant may not be able to complete the request without prompting the second user to log into their account and repeat the request. As a result, computational and communication resources, such as network bandwidth and channel usage time, can be consumed by increasing a number of interactions between the vehicle computing device and the server.

SUMMARY

Implementations described herein relate to limiting vehicle automated assistant responsiveness according to a restriction(s) that is used to determine whether certain input commands and/or certain users are restricted in certain vehicle contexts. Furthermore, implementations described herein allow for other users to override certain restrictions by providing authorization via an input to the vehicle computing device or other computing device. Allowing other users to override such restrictions can preserve computational resources, as less processing resources and network bandwidth would be consumed when a restricted user does not have to rephrase and resubmit certain inputs in a way that would make the inputs permissible. As an example, a passenger that provides a spoken input to a vehicle automated assistant such as "Assistant, send a message to Karen," may be denied because the passenger is not the owner of the vehicle or otherwise permitted to access contacts accessible to the vehicle automated assistant. As a result, the vehicle automated assistant can provide a response such as "I'm sorry, you are not authorized for such commands," and the passenger would have to rephrase and resubmit the spoken input as, for example, "Ok, Assistant, send a message to 971-555-3141." Such a dialog session between the passenger and the vehicle automated assistant can waste computational resources as the subsequent spoken input would have to be converted to audio data, transmitted over a network, and subsequently processed. In a situation where available bandwidth is limited or variable, such as for example in a moving vehicle, this might be particularly undesirable since the channel over which data is communicated from the assistant device, over the network, may need to be used for longer than desirable. The length of time such a channel is used might impact not only operations of the automated assistant but also other software applications which rely on the network to transmit and receive information. Such software applications may, for example, be present in the same device as the automated assistant (e.g. other in-vehicle software applications). However, implementations provided herein can eliminate such wasting of computational and communication resources by at least allowing other users to authorize execution of certain input commands from a user, without requesting the user to re-submit the commands.

In some implementations, a vehicle computing device and/or an automated assistant can operate according to one or more different restrictions for restricting access to commands and/or data that would otherwise be accessible via the vehicle computing device and/or the automated assistant. A restriction can characterize one or more particular commands, data, type(s) of data, and/or any other input(s) and/or output(s) that can be associated with an automated assistant, thereby defining certain information that is available to other users via the automated assistant and/or the vehicle computing device. When a user provides a spoken utterance corresponding to a particular command characterized by a restriction, the automated assistant can respond according to any restriction that is associated with the user and/or the particular command. As an example, when a user provides a spoken utterance that corresponds to data that originated at a computing device owned by another user, the spoken utterance can satisfy a criterion for restricting access to such data. However, in response to receiving the spoken utterance, the automated assistant can determine that the criterion is satisfied and await authorization from the other user. The authorization can be provided by the other user to the vehicle computing device and/or a separate computing device via another spoken utterance and/or any other input capable of being received at a computing device. In some implementations, a vehicle that includes the vehicle computing device can include an interface, such as a button (e.g., on a steering wheel of the vehicle), that the other user can interact with (e.g., depress the button) in order to indicate authorization to the automated assistant. In response to the automated assistant receiving authorization from the other user, the automated assistant can proceed with executing the command provided by the user, without necessarily requesting further input from the user.

In some implementations, another user can limit a passenger from accessing certain data while the other user and the passenger are riding in the vehicle. Specifically, the other user can limit access to certain data while the vehicle is navigating along a particular route and/or to a particular destination. Therefore, when the vehicle completes the route, and/or arrives at the particular destination, a restriction on access to the particular data and/or for the passenger can be released, thereby allowing the passenger to subsequently access such data. For instance, when the other user is driving the vehicle and the passenger is riding in the vehicle, the passenger can provide a spoken utterance to an automated assistant interface of the vehicle. The spoken utterance can be, "Assistant, call Aunt Lucy." In response, and because the spoken utterance includes a request that will result in accessing contact information of the user, the automated assistant can await authorization from the user before fulfilling the request. However, in order to eliminate having to repeatedly authorize or not authorize requests originating from the passenger, the user can provide another spoken utterance such as, "Assistant, do not respond to the passenger for the remainder of this trip." In response, the automated assistant can cause restriction data to be generated for limiting access to one or more services (e.g., making phone calls) that would otherwise be available via the automated assistant. In this way, the user would not have to repeatedly authorize or not authorize the automated assistant to respond to requests from the passenger, thereby eliminating waste of computational resources and network resources. Furthermore, because the access restrictions can be set to "reset" at the end of a trip, or upon reaching a destination, the user would not have to explicitly request a reset of restrictions, thereby further eliminating waste of computational resources and network resources.

Additionally, or alternatively, the user can limit access to certain data to a passenger indefinitely and/or for an operational lifetime of the vehicle. For instance, subsequent to the passenger providing the spoken utterance, "Assistant, call Aunt Lucy," and while the automated assistant is awaiting authorization from the user, the user can provide a separate spoken utterance such as, "Assistant, never respond to the user." In response, the automated assistant can cause restriction data to be generated for indefinitely (or for an operational lifetime of the vehicle, the vehicle computing device, and/or the automated assistant) limiting access to one or more services that would otherwise be available to a particular user via the automated assistant.

In some implementations, depending on an occupancy of the vehicle, the automated assistant and/or the vehicle computing device can operate according to an operating mode that limits access to the automated assistant and/or the vehicle computing device for certain passengers. As an example, when a user is the only person occupying a vehicle, a vehicle computing device and/or an automated assistant that is accessible via the vehicle computing device, can operate according to a first operating mode. The occupancy can be determined based on an output of one or more sensors of the vehicle, the vehicle computing device, and/or any other device that can provide an output from which occupancy can be estimated. The first operating mode can be selected based on the occupancy and can provide the user access to a first set of services, data, and/or commands, associated with the automated assistant. When the occupancy is determined to include more than the user, such as when the user is driving with one or more passengers (e.g., a parent driving with multiple children as passengers), a second operating mode can be selected. In accordance with the second operating mode, the user can still access the first set of services, data, and/or commands—however, the one or more passengers would only be able to access a second set of services, data, and/or commands. In some implementations, the second set can be different than the first set, and/or the second set can be a reduced subset relative to the first set. For example, push "talk" button on head unit, when only a driver (e.g., an unrestricted user) is in the vehicle, can respond with private data without any further authorization. However, if the "talk" button on the head unit is pushed when a passenger (e.g., a restricted user) is in the vehicle with the driver, the automated assistant request further authorization to respond to someone (e.g., the passenger) pressing the "talk" button on the head unit.

While the second operating mode (e.g., a shared operating mode) is active, a passenger can attempt to access a service, data, and/or a command that is exclusively provided in the first set, and not the second set. In order to permit such access, the user (e.g., the driver) can provide one or more inputs to the automated assistant and/or the vehicle computing device, in order to authorize such access. The user can provide, for example, an input to an interface such as a button and/or touch display panel, which can be located approximately within reach of a driver of the vehicle (e.g., a button on a steering wheel, a touch display panel integral to a dashboard and/or console). In some implementations, the authorizing input can be provided in response to the automated assistant soliciting authorization from the user (e.g., "Sorry, I need authorization to do that . . . [authorizing input subsequently received]"). Alternatively, the automated assistant can bypass soliciting the user for authorization, and, rather, passively await to respond to a request from a passenger until the user provides an authorizing input. However, if the user elects to have their automated assistant and/or their vehicle computing device operate according to a third operating mode. In the third operating mode, in which no option to provide such authorization is available, the automated assistant and/or the vehicle computing device can operate such that availability of certain operations, data, and/or services are limited for some passengers (at least relative to a user that is a primary and/or "master" user with respect to the automated assistant and/or the vehicle computing device).

In some implementations, an automated assistant can perform one or more automated assistant routines. An automated assistant routine can correspond to set and/or sequence of actions performed and/or initialized by the automated assistant in response to a user providing a particular input. As an example, the user can provide a spoken utterance such as, "Assistant, let's go to work," when the user enters their vehicle, in order to cause the automated assistant to perform a "Going to Work" routine. The "Going to Work" routine can involve the automated assistant causing the vehicle computing device to render graphical data corresponding to a daily schedule of the user, render audio data corresponding to a podcast selected by the user, and generate a message to a spouse of the user indicating that the user is headed to work (e.g., "Hi Billy, I'm headed to work."). In some instances, however, a passenger of the vehicle can provide the spoken utterance, "Assistant, let's go to work." Depending on the mode that the vehicle computing device and/or the automated assistant is operating in, the automated assistant can request that the driver, or other authorized user, provide permission to perform one or more actions of a requested routing.

For example, in response to the passenger invoking the "Going to Work" routine, the automated assistant can initialize performance rendering audio data corresponding to a particular podcast, and also prompt the driver for authorization to initialize other actions of the routine. Specifically, the vehicle computing device and/or server device can identify actions of the routine that involve accessing restricted data. In this instance, the vehicle computing device and/or the server device can determine that the schedule of the user and the contacts of the user (for sending the message) are restricted data. As a result, during performance of the routine, the driver can be prompted one or more times to give permission to execute any action(s) involving accessing restricted data. If the driver gives authorization (e.g., via an assistant invocation task), by speaking an invocation phrase (e.g., "Ok, Assistant.") or interacting with an interface (e.g., pressing a button), the routine can be completed. For instance, and in furtherance of the aforementioned example, the message can be sent to the spouse and/or the schedule of the driver can be rendered audibly.

However, if authorization is not provided by the driver (e.g., the driver does not perform an assistant invocation task), the automated assistant can bypass performance of such actions. In some implementations, when the driver does not provide authorization to complete the actions, alternative actions can be provided as options to the passenger. For instance, instead of audibly rendering the schedule of the driver, the automated assistant can audibly render public information about events that are occurring in the nearby geographic region. Additionally, or alternatively, instead of sending a message to a spouse of the driver, the automated assistant can audibly prompt the passenger regarding whether they would like to have a message transmitted via their own account (e.g., "Would you like to login, in order to send a message?"). In this way, restrictions on data of the driver would be enforced while simultaneously providing assistance to a passenger who may be in the vehicle due to, for example, participation in a ride-sharing activity.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
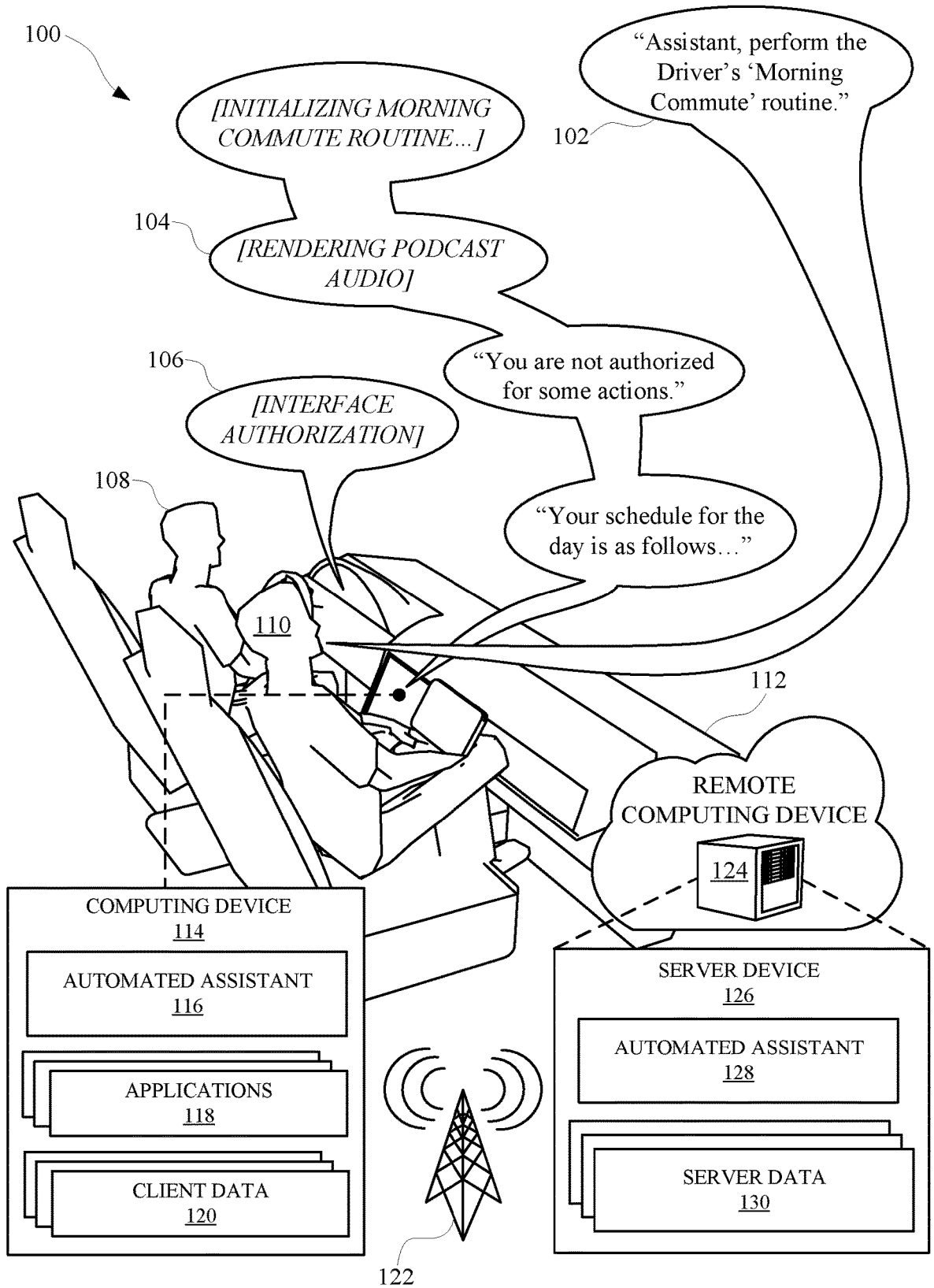
FIG. 1A illustrates a view of a user authorizing continued performance of a routine initialized by another user, subsequent to the other user initializing a routine that involves accessing restricted data.

FIG. 1A illustrates a view 100 of a user 108 authorizing continued performance of a routine initialized by another user 110, subsequent to the other user 110 initializing a routine that involves accessing restricted data. Restricted data can refer to any data that is associated with an account of the user 108, and can be accessed by providing credentials in order to log into the account of the user 108. By allowing the user 108 to authorize such interactions, through one or more different modalities, network bandwidth and other computational resources can be preserved, at least by reducing a number of interactions between a client device and a server device 126.

In some implementations, the user 108 can be an unrestricted user with respect to access to restricted data and/or an automated assistant 116, that is accessible via a computing device 114 of a vehicle 112. The computing device 114 can be a vehicle computing device that is connected to one or more different interfaces, through which the user 108 and/or the other user 110 can provide inputs to the computing device 114, and receive output from the computing device 114. For instance, the user 108 and/or the other user 110 can perform an assistant invocation task for invoking the automated assistant 116 and/or an automated assistant 128, that is accessible to the computing device 114 via a network 122, such as the internet. The assistant invocation task can include speaking a particular invocation phrase such as, but not limited to, "Ok, Assistant," and/or a voice characteristic(s) of the user being verified in response. For instance, the user can provide a particular, or any spoken utterance, to the automated assistant interface, and audio data corresponding to the spoken utterance can be processed to determine whether one or more voice characteristics of an authorized and/or unrestricted user are embodied in the audio data. When the one or more voice characteristics of an authorized and/or unrestricted user are embodied in the audio data, authorization can be considered received.

Additionally, or alternatively, the assistant invocation task can include the user interacting with an interface of the computing device 114 by performing a gesture such as, but not limited to, pressing a button, tapping a touch interface, providing a fingerprint, looking into a camera for performing facial recognition, and/or any other gesture that can invoke an automated assistant. The automated assistant 116 can access client data 120 and/or server data 130 when executing certain actions requested by a particular user. Furthermore, depending on an action that is requested, the automated assistant 116 can access one or more applications 118 in furtherance of executing an action. In some implementations, applications and/or data that are accessible to the automated assistant can be third-party applications and/or third-party data, at least relative to a party or entity that provides the automated assistant.

In some implementations, a user can invoke the automated assistant and/or provide authorization to the automated assistant via one or more different interfaces of a vehicle. Furthermore, an effect of interacting with a particular interface can be contingent upon an occupancy of the vehicle. As an example, when multiple persons are in a vehicle, a button on the steering wheel of the vehicle can be designated, by the vehicle computing device, as an exclusive touch interface for invoking and/or providing authorization to the automated assistant. Additionally, or alternatively, when only one person is in the vehicle, the vehicle computing device can designate the button on the steering wheel, and/or one or more other buttons (e.g., a button attached to a backseat and/or a touch interface of a display panel), for invoking and/or providing authorization to the automated assistant.

The automated assistant 116 can perform routines, which can be configured by the user 108, the other user 110, and/or can be reconfigured by an entity that provides the automated assistant. Furthermore, a routine can include one or more actions that involve accessing restricted data, or any data that corresponds to one or more particular access rights. For example, when the other user 110 provides a spoken utterance 102 such as, "Assistant, perform the drivers morning commute routine," the automated assistant can perform a series of actions that were previously specified by the user 108. One or more of the actions for they requested routine can involve accessing restricted data, such as calendar data stored in association with an account of the user 108. For example, the series of actions corresponding to the morning commute routine can include playing a podcast, and/or rendering audio and/or visual content that is based on calendar data for the current day.

In response to receiving the spoken utterance 102, the computing device 114 and/or the server device 126 can determine an occupancy of the vehicle 112. The occupancy can be determined based on sensor data from one or more sensors that are connected to the vehicle 112 and/or the computing device 114. For example, and with permission from the user 108 and/or the other user 110, certain sensors, such as one or more of a microphone, a camera, a motion sensor, a weight sensor, a heat sensor, a tactile sensor, and/or any other sensor that can be used to detect occupancy of an area. When the determined occupancy indicates that more than one person is located within the vehicle 112, a computing device 114, and/or the server device 126, can determine whether the routine includes one or more actions that involve accessing restricted data. For example, the computing device 114 can determine whether the morning commute routine involves accessing restricted data. Because the morning commute routine involves accessing calendar data corresponding to the user 108, the computing device 114 can positively determine that the morning commute routine involves accessing restricted data.

When the computing device 114 and/or the server device 126 have identified one or more actions of the routine that involve accessing restricted data, the computing device 114 and/or the server device 126 can cause the automated assistant 116 to initialize performance of one or more actions of the routine that do not involve accessing restricted data. For instance, an action of rendering podcast audio can involve accessing unrestricted data, and therefore can be initialized by the automated assistant 116 in order to provide an output 104 via the vehicle computing device 114. While they computing device 114 is rendering the output 104 that includes podcast audio, the automated assistant 116 can provide another output 104 via a speaker of the vehicle 112 and/or a display panel of the vehicle 112, in order to indicate that the other user 110 is not authorized to cause certain actions to be performed. For example, the automated assistant 116 can provide an output such as, "You are not authorized for some actions."

The user 108 can acknowledge the output 104 from the automated assistant 116, and provide authorization via an interface of the vehicle computing device 114. In other words, with or without being prompted by the automated assistant 116, the user 108 can provide an input in order to cause the automated assistant 116 to proceed with executing restricted actions of the routine. As an example, the user 108 can provide an interface authorization 106 by pressing a button on the steering wheel of a vehicle 112, tapping a touch interface of the vehicle 112, providing a spoken utterance to a microphone of the vehicle 112 or a peripheral device, and/or otherwise provide an authorization input to the computing device 114 and/or the server device 126.

In response to the computing device 114 and/or the server device 126 receiving the interface authorization 106 from the user 108, the automated assistant 116 can continue performing the requested routine. In other words, because the automated assistant 116 had stopped performance of the action that involved accessing the calendar data of the user 108, the automated assistant 116 can proceed with an action in response to the user 108 providing the interface authorization 106. Therefore, in response to the interface authorization 106, the automated assistant 116 can provide an output 104 such as, "Your schedule for the day is as follows . . . ."

By allowing the user 108 to provide authorization without necessitating further input from the other user 110, network bandwidth can be preserved over the network 122, and/or any other communication channel involved in interactions between the users and the automated assistant 116. Furthermore, other computational resources can be preserved, such as processing resources that would otherwise be expended on processing natural language input from the other user 110. In some implementations, verification of an identity of the user 108 can be performed prior to the interface authorization 106. For example, based on one or more sensors of the vehicle 112, the computing device 114 and/or the server device 126 can determine that the user 108 is an unrestricted user with respect to the automated assistant 116. Such verification can be based on a voice signature of a previous spoken utterance provided by the user 108, facial recognition previously performed when the user 108 and the other user 110 are in the vehicle 112, fingerprint sensing, and/or any other process through which an identity of the user 108 can be verified, with prior permission from the user 108.

Figure 1B:
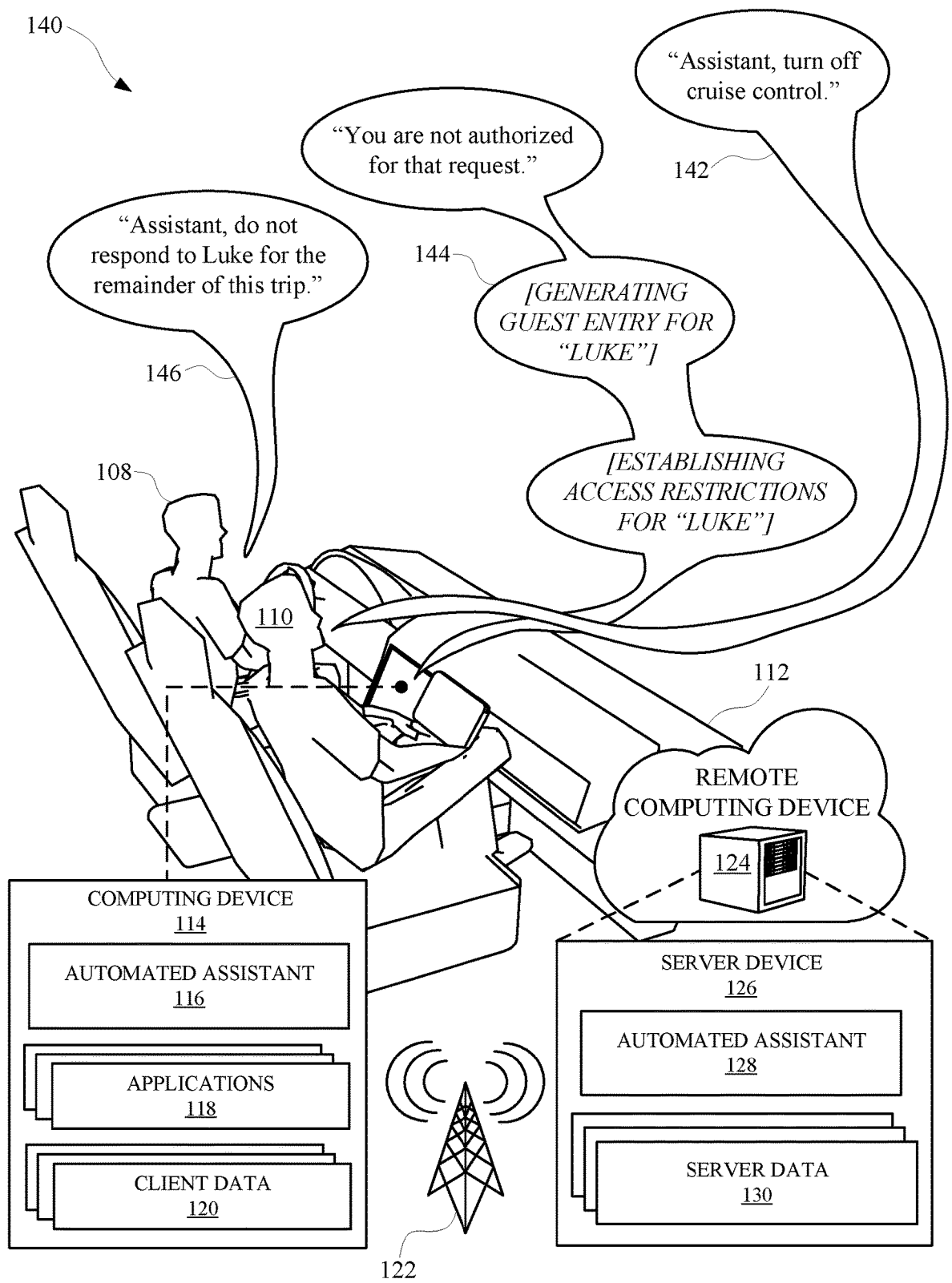
FIG. 1B illustrates a view of a user setting a contextual restriction on access to data, services, an automated assistant, and/or any other information or module that can be accessed via the computing device.

FIG. 1B illustrates a view 140 of a user 108 setting a contextual restriction on access to data, services, an automated assistant, and/or any other information or module that can be accessed via the computing device 114. The user 108 can establish a contextual restriction by providing an input to an automated assistant 116. When the user 108 provides the input, a voice signature of the user 108 can be verified, and one or more accounts associated with the user 108 can be identified based on the voice signature. Furthermore, when the input corresponds to a request to apply a contextual restriction, the automated assistant 116 can cause certain settings to be generated and/or modified in furtherance of establishing access restrictions. In some implementations, the user 108 can request certain access restrictions be enforced when a particular context is temporary, such as when the user 108 and the other user 110 are riding in the vehicle 112. Such restrictions can be useful in order to eliminate distractions created by passengers within the vehicle who may be attempting to communicate with the automated assistant 116. Furthermore, such restrictions can be useful to eliminate safety risks that maybe apparent when inexperienced users, such as children, provide requests to the automated assistant 116 that can affect an operation of the vehicle 112.

As an example, the other user 110 can provide a spoken utterance 142 such as, "Assistant, turn off cruise control." In response to receiving the spoken utterance, the automated assistant 116 can determine, based on audio data characterizing the spoken utterance 142, that the spoken utterance 142 was not provided by put on restricted user, and/or was provided by an unrestricted user. In response, the automated assistant 116 can cause an interface of the computing device 114 to provide an output 144 such as, "You are not authorized for that request." In view of this denial of the request, and in order to eliminate further wasting of computational resources in processing inputs from the other user 110, the user 108 can provide a separate spoken utterance 146, requesting a contextual restriction be established. Specifically, the user 108 can provide a spoken utterance 146 such as, "Assistant, do not respond to Luke for the remainder of this trip."

In response to receiving the spoken utterance 146 from the user 108, the automated assistant 116 can initialize generation of one or more access restrictions, which can be characterized by restriction data. In some implementations, when the other user 110 is providing a spoken utterance for the first time to the automated assistant 116, the automated assistant 116 can generate a guest entry corresponding to the other user 110. The guest entry can correspond to a guest account, with which the automated assistant 116 can also correlate the restriction data. In some implementations, an identifier for the guest account can be determined using one or more inputs from the user 108, such as the spoken utterance 146, (which specifies the name of the other user 110 (e.g., Luke)) a typed input which can be provided at a touch display panel of the vehicle 112, and/or any other input that can be used to identify a name for a user.

In some implementations, restriction data can characterize a context in which one or more restrictions apply. For instance, because the user 108 specified that the automated assistant 116 should not respond to the other user 110 for the remainder of the trip, a computing device 114 and/or the server device 126 can identify navigation data characterizing a current trip of the vehicle 112. In some implementations, client data 120 corresponding to one or more applications 118 can be accessed, with permission from the user 108, in order to determine a current context of the user 108, the vehicle 112, and/or the other user 110. For instance, the client data 120 can specify a destination for the vehicle 112, as specified by the user 108 via a navigation application. Therefore, the restriction data can characterize a restriction on access to the automated assistant 116 while the vehicle 112 is navigating and/or otherwise driving to the destination. As an example, from the current time, after which the user 108 provided the spoken utterance 146, and a time when the vehicle 112 arrives at the destination, the automated assistant 116 can be unresponsive to one or more requests and/or other inputs from the other user 110. In this way, computational resources can be preserved by not requesting authorization during the remaining portion of the trip, but rather, can follow the instructions of the user 108 to not be responsive to the other user 110. Furthermore, by allowing the user 108 to set up contextual restrictions with the automated assistant, interactions between passengers and the automated assistant can be streamlined based on preferences of an unrestricted user. For instance, rather than constantly requesting authorization from the user 108, or awaiting authorization, the automated assistant 116 can deal with certain inputs from other users according to restrictions specified by the user 108. This can result in less frequency of interactions with the automated assistant 116 during vehicle drive times, thereby preserving stored energy that is available to the vehicle 112, and which may not be immediately recharged.

Figure 1C:
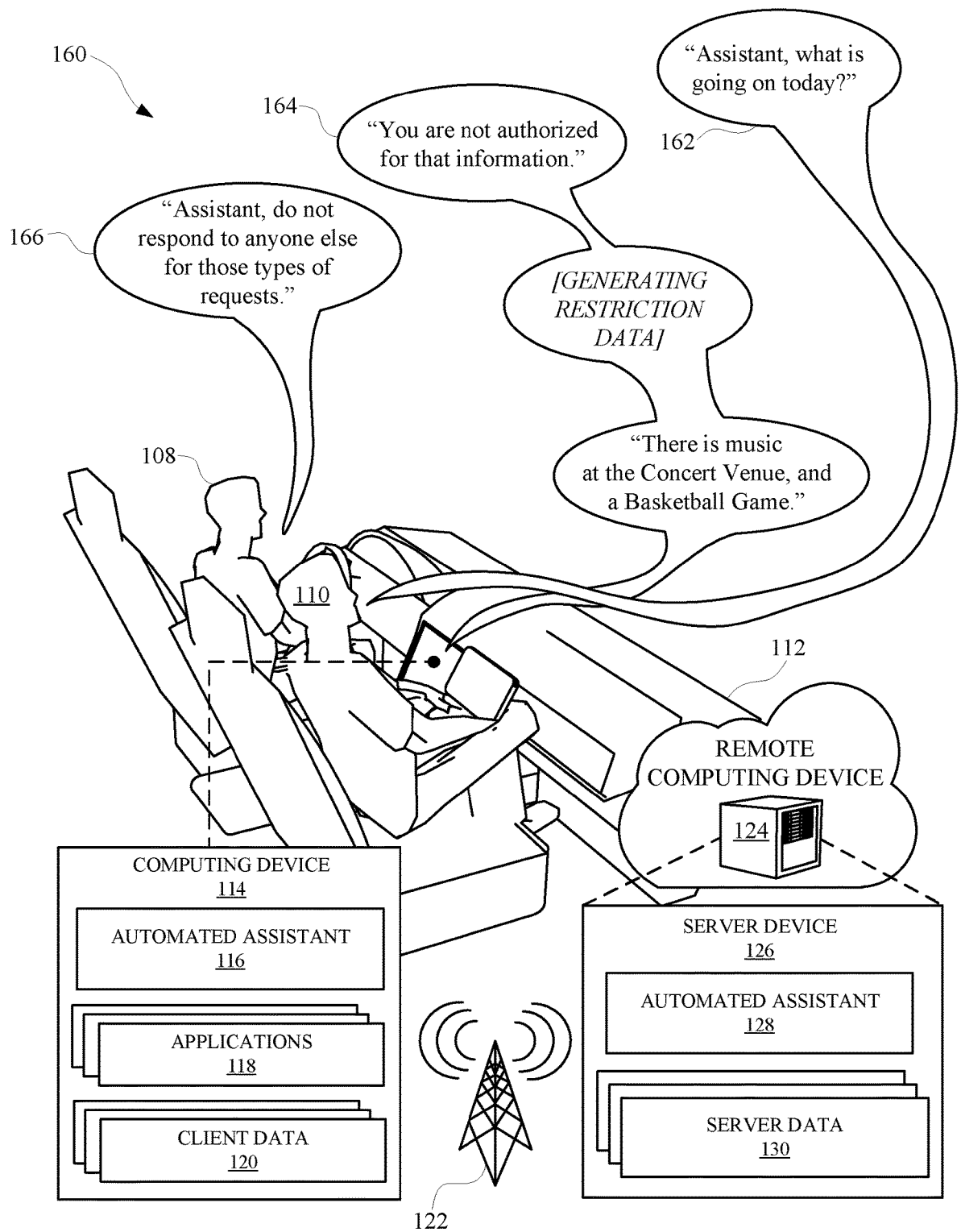
FIG. 1C illustrates a view of the user establishing restrictions on certain types of requests that can be provided by passengers and/or other persons that can occupy the vehicle.

FIG. 1C illustrates a view 160 of the user 108 establishing restrictions on certain types of requests that can be provided by passengers and/or other persons that can occupy the vehicle 112. Specifically, the user 108 and/or any other unrestricted user can provide a spoken utterance to the automated assistant 116 in order to specify certain restrictions that the automated assistant 116 will comply with. In some implementations, the user 108 can provide a request to the automated assistant 116 in order to prevent the automated assistant 116 from responding to certain types of requests from other persons within the vehicle 112. For example, when the user 108 is operating their vehicle 112 in furtherance of participating in ride-sharing activity, the user 108 can establish certain restrictions that will be enforced specifically when the user 108 is operating their vehicle for ride-sharing services. In some implementations, the automated assistant 116 can determine that the user 108 is operating the vehicle 112 in furtherance of ride-sharing activity by accessing one or more applications 118 of the computing device 114, the server device 126, and/or any other computing device that can be associated with the user 108.

For example, the user 108 can operate a ride-sharing application during a particular voyage of the vehicle 112. Client data 120 of the computing device 114 can characterize this activity, and the automated assistant 116 can access the client data 120 in order to determine that the user 108 is engaging in such activity. As a result, the automated assistant 116 and/or the automated assistant 128 can operate in accordance with one or more restrictions established for governing interactions with the automated assistant 116 and/or the automated assistant 128 when the user 108 is participating in ride sharing activity.

In some implementations, in order to establish a particular restriction, the user 108 can provide a spoken utterance 166 during an attempted interaction between another user 110 and the automated assistant 116. For example, when the user 108 is participating in a ride sharing activity in which the other user 110 is also participating, the other user 110 can provide a spoken utterance 162 such as, "Assistant, what is going on today?" In response to receiving the spoken utterance 162, the computing device 114 and/or a remote computing device 124, such as a server device 126, can process audio data corresponding to be spoken utterance 162. Based on the processing, a computing device 114 and/or the server device 126 can determine that the other user 110 is not an unrestricted user like the user 108. Therefore, in response to receiving the spoken utterance 162, the automated assistant 116 can provide an output 164 such as, "You are not authorized for that information."

In order to cause a restriction to be generated for restricting access and/or otherwise limiting responses of the automated assistant 116 in such situations, the user 108 can provide a request to the automated assistant 116. Specifically, the user 108 can provide a spoken utterance 166 such as, "Assistant, do not respond to anyone else for those types of requests." Audio data corresponding to the spoken utterance 166 can be processed at the computing device 114 and/or the server device 126. Based on the processing, restriction data can be generated for characterizing a restriction on one or more particular types of request that can be responded to by the automated assistant 116, when one or more particular types of requests are provided by restricted users, and/or any other user that is not an unrestricted user.

In some implementations, in order to characterize the type of request embodied by the spoken utterance 162, a context of the spoken utterance 162 can be determined from one or more sources of data. For example, the type of request can be characterized as a request from a passenger during ride sharing activity. Therefore, when the restriction data is generated, the restriction data can characterize a limitation on what passengers can request when they are riding in the vehicle 112 and in furtherance of ride sharing activity. Alternatively, or additionally, the type of request can be determined based on data that would have been accessed in order to fulfill the request. For example, as provided in FIG. 1C, the other user 110 requested information about what is going on today, but if such request had been provided by the user 108, fulfilling the request would involve accessing calendar your data associated with the user 108. Therefore, the restriction data can characterize a limitation on requests related to calendar data, as well as a limitation on such requests being provided by a passenger during ride sharing activity.

In some implementations, restriction data can characterize limitations that are based on occupancy and whether the vehicle is being operated in furtherance of ride sharing activities. For instance, when one or more sensors indicate that the vehicle is occupied by multiple persons, and a ride sharing application indicates that the vehicle is currently being used for ride sharing activities, more limitations on the automated assistant can be enforced, at least relative to when the vehicle is occupied by multiple persons but not currently being used for ride sharing activities. In this way, for example, stricter limitations on access to restricted data can be enforced at times when multiple persons are in the vehicle and the vehicle is operating in furtherance of ride sharing activity, compared to if a user is merely driving with their family or friends (e.g., not ride sharing customers). Furthermore, this prevents the user from having to provide restriction requests to the automated assistant each time a new person enters their car while their ride sharing application indicates that they are operating their vehicle in furtherance of ride sharing activities.

In some implementations, and based on the restriction data, the automated assistant 116 can operate such that calendar data is not available to the other user 110, and elect to respond to the other user 110 using publicly available data. For example, the automated assistant 116 can render an output 164 such as, "There is music at the Concert Venue, and a basketball game." In this way, should the other user 110 and/or another passenger provide a similar type of request to the automated assistant 116. The computing device 114 and/or the server device 126 would not have to provide an output 164 indicating a lack of authorization, nor would the computing device 114 and/or the server device 126 necessarily have to process input from the user 108. Rather, restriction data that is available can be processed along with any subsequent spoken utterance in order to determine certain limitations that are currently in effect. Based on such limitations, the automated assistant 116 can render a response to any subsequent user or passenger, without providing an output denying the request, and/or a prompt to the user 108 requesting authorization.

Figure 2:
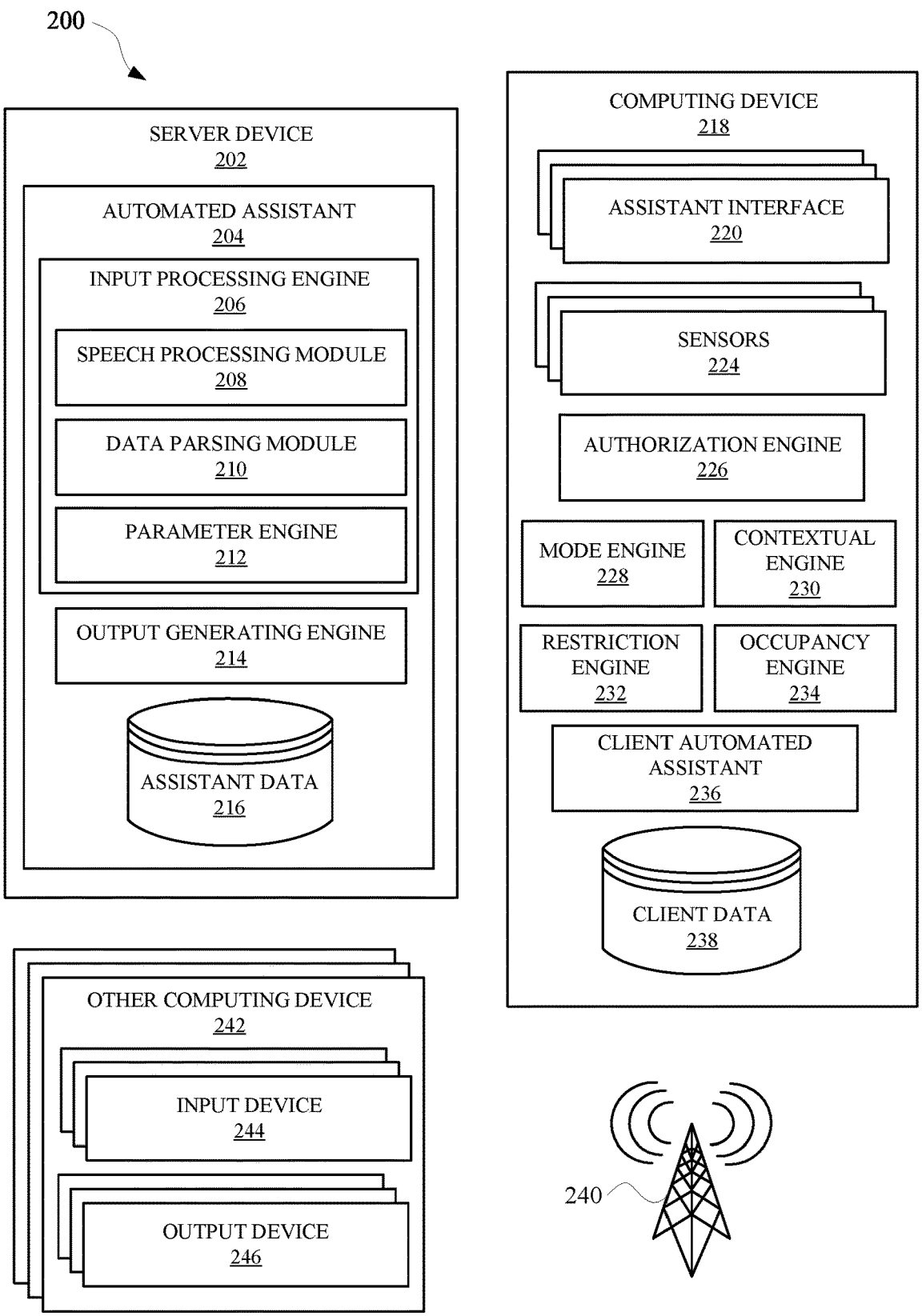
FIG. 2 illustrates a system for allowing a user to employ restrictions on particular interactions between passengers of the vehicle and an automated assistant, and/or authorize such interactions using one or more different modalities.

FIG. 2 illustrates a system 200 for enabling authorization of certain automated assistant functions via one or more modalities available within a vehicle. The automated assistant 204 can operate as part of an assistant application that is provided at one or more computing devices, such as a computing device 218 and/or a server device 202. A user can interact with the automated assistant 204 via an assistant interface 220, which can be a one or more of a microphone, a camera, a touch screen display, a user interface, and/or any other apparatus capable of providing an interface between a user and an application. For instance, a user can initialize the automated assistant 204 by providing a verbal, textual, or a graphical input to the assistant interface 220 to cause the automated assistant 204 to perform a function (e.g., provide data, control a peripheral device, access an agent, generate an input and/or an output, etc.). The computing device 218 can include a display device, which can be a display panel that includes a touch interface for receiving touch inputs and/or gestures for allowing a user to control applications of the computing device 218 via the touch interface. In some implementations, computing device 218 can lack a display device, thereby providing an audible user interface output, without providing a graphical user interface output. Furthermore, the computing device 218 can provide a user interface, such as a microphone, for receiving spoken natural language inputs from a user. In some implementations, the computing device 218 can include a touch interface and can be void of a camera, but can optionally include one or more other sensors.

The computing device 218 and/or other computing devices 234 can be in communication with the server device 202 over a network 240, such as the internet. Additionally, the computing device 218 and the other computing devices 242 can be in communication with each other over a local area network (LAN), such as a Wi-Fi network. The computing device 218 can offload computational tasks to the server device 202 in order to conserve computational resources at the computing device 218. For instance, the server device 202 can host the automated assistant 204, and computing device 218 can transmit inputs received at one or more assistant interfaces 220 to the server device 202. However, in some implementations, the automated assistant 204 can be hosted at the computing device 218 as a client automated assistant 236.

In various implementations, all or less than all aspects of the automated assistant 204 can be implemented on the computing device 218. In some of those implementations, aspects of the automated assistant 204 are implemented via the client automated assistant 236 of the computing device 218 and interface with the server device 202 that implements other aspects of the automated assistant 204. The server device 202 can optionally serve a plurality of users and their associated assistant applications via multiple threads. In implementations where all or less than all aspects of the automated assistant 204 are implemented via a client automated assistant 236 at the computing device 218, the client automated assistant 236 can be an application that is separate from an operating system of the computing device 218 (e.g., installed "on top" of the operating system)—or can alternatively be implemented directly by the operating system of the computing device 218 (e.g., considered an application of, but integral with, the operating system).

In some implementations, the automated assistant 204 and/or the client automated assistant 236 can include an input processing engine 206, which can employ multiple different modules for processing inputs and/or outputs for the computing device 218 and/or the server device 202. For instance, the input processing engine 206 can include a speech processing module 208 that can process audio data received at an assistant interface 220 to identify the text embodied in the audio data. The audio data can be transmitted from, for example, the computing device 218 to the server device 202 in order to preserve computational resources at the computing device 218.

The process for converting the audio data to text can include a speech recognition algorithm, which can employ neural networks, and/or statistical models for identifying groups of audio data corresponding to words or phrases. The text converted from the audio data can parsed by a data parsing module 210 and made available to the automated assistant as textual data that can be used to generate and/or identify command phrases from the user. In some implementations, output data provided by the data parsing module 210 can be provided to a parameter module 212 to determine whether the user provided an input that corresponds to a particular action and/or routine capable of being performed by the automated assistant 204 and/or an application or agent that is capable of being accessed by the automated assistant 204. For example, assistant data 216 can be stored at the server device 202 and/or the computing device 218, as client data 238, and can include data that defines one or more actions capable of being performed by the automated assistant 204 and/or client automated assistant 236, as well as parameters necessary to perform the actions.

In some implementations, the system 200 can allow one or more users to employ restrictions on particular interactions between passengers of a vehicle and an automated assistant, and/or authorize such interactions using one or more different modalities. The system 200 can include a variety of different engines which can be embodied as executable data at one or more computing devices. The computing device 218 can be incorporated into a vehicle such as, but not limited to, a car, a truck, on airplane, an aerospace vehicle, a commercial vehicle, and/or any other apparatus and that can be associated with a computing device. A vehicle that includes the computing device 218 can provide space for one or more persons to ride in the vehicle. Furthermore, while one or more persons are riding in the vehicle, the one or more users can interact with the client automated assistant 236 and/or the automated assistant 204 via one or more assistant interfaces 220. However, in some implementations, the computing device 218 and/or the server device 202 can be restricted according to a variety of contexts in which one or more persons are interacting with the computing device 218 and/or the server device 202.

In some implementations, the computing device 218, the automated assistant, and/or the server device 202 can operate according to different operating modes. An operating mode can be selected by a mode engine 228, which can determine a suitable operating mode depending on a context in which the computing device 218, the automated assistant, and/or the server device 202 are operating. For example, a contextual engine 230 can determine that a user is accessing a ride-sharing application via the computing device 218 while driving the vehicle. The contextual engine 230 can generate contextual data, and share the contextual data with the mode engine 228. The mode engine 228 can determine, based on the contextual data, to operate the computing device 218 and/or the automated assistant according to a first operating mode. The first operating mode can be, for example, a restricted operating mode in which any passenger in the vehicle will be unable to access services, actions, and/or information that is based on restricted data stored in the client data 238 and/or the assistant data 216. Furthermore, the first operating mode can be, for example a restricted operating mode in which the driver will be able to access services, actions, and/or information that is based on restricted data, and is otherwise accessible to the driver when not driving the vehicle in furtherance of ride-sharing activity. In this way, should a passenger or other guests to the vehicle attempt to invoke be client automated assistant 236, the client automated assistant 236 can be responsive without providing an error message and/or otherwise involving undo interactions. For example, by allowing the first operating mode to be selected by the mode engine 228 without direct input, such as a spoken utterance, computational resources can be preserved as less inputs would be processed (e.g., the user would not have to provide a request to restrict access to a passenger, every time a new passenger attempted to invoke the automated assistant).

In some implementations, an assistant invocation task can effectuate different operations of the automated assistant according to an occupancy of the vehicle. For example, when the vehicle is exclusively occupied by a person that is sitting in a seat for the driver, any button and/or other interface within the vehicle can provide unrestricted access to the automated assistant. However, when more than one person is in the vehicle, an interface (e.g., a button) on the steering wheel of the vehicle can provide unrestricted access to the automated assistant, whereas other interfaces located closer to passengers' seats can provide restricted access to the automated assistant. In this way, should a passenger invoke the automated assistant by performing an assistant invocation task, such as pressing a button on a passenger side door, the passenger would not be able to cause the automated assistant to access restricted data. Rather, the passenger would have to wait for an unrestricted user to provide authorization and/or the driver to interact with an interface on the steering wheel, or other interface that is accessible to a driver of the vehicle while the driver is driving the vehicle.

In some implementations, one or more users of an automated assistant can request restrictions associated with their own particular account and/or their own particular data. As an example, when a user is driving the vehicle that includes the computing device 218, the user can provide a spoken utterance, and/or any other input, requesting that a restriction be generated. The spoken utterance can be processed at the input processing engine 206, and the output generating engine 214 can communicate with a restriction engine 232. The restriction engine 232 can determine, based on processing at the spoken utterance, one or more restrictions to establish. For example, in some implementations, the user can request that the automated assistant limit provisioning of restricted data when more than one person is in the vehicle. Occupancy of the vehicle can be determined by an occupancy engine 234, which can receive sensor data from one or more sensors 224 of the vehicle. The sensors 224 can include one or more of a touch interface, a microphone, a video camera, a tactile sensor, a weight sensor, an infrared sensor, a motion sensor, and/or any other sensor that can be used to detect occupancy of an area or volume.

Based on the occupancy, determined by the occupancy engine 234, the restriction engine 232 can select one or more restrictions with which to enforce in order to limit interactions between one or more occupants of the vehicle and the computing device 218, an automated assistant, and/or the server device 202. For example, in furtherance of the aforementioned example, when the user is riding in the vehicle with another passenger, the occupancy engine 234 can determine that multiple persons are in the vehicle and the restriction engine 232 can, based on the occupancy, enforce the restriction of provisioning restricted data when multiple persons are in the vehicle. In this way, each time the user gets in the vehicle with another passenger, they do not need to repeat restriction requests. Rather, the user can rely on occupancy being detected, and one or more restrictions being enforced according to the occupancy. For example, if the user had set a private reminder regarding an event, and the user is in the vehicle with another person when the reminder is set to go off, provisioning at the reminder can be limited at least with respect to the restricted data that might be revealed. Therefore, instead of the computing device 218 rendering audio or visual data characterizing the reminder, the computing device 218 can render audio data characterizing a notification sound, or render display data characterizing a graphical notification. Should the user want to bypass the restriction they had previously set forth, the user can provide authorization via the computing device 218, and/or one or more other computing devices 242.

For example, when the user is not driving the vehicle but is a passenger in the vehicle, the user can access another computing device 242, and provide an input to an input device 244 of the other computing device 242 in order to indicate authorization for provisioning the restricted data. In some implementations, the other computing device 242 can transmit authorization data to the computing device 218, which can be processed by an authorization engine 226, in order to confirm that authorization was provided by the user. In response to the authorization engine 226 confirming that authorization was received from the user, the authorization engine 226 can generate confirmation data, which can be transmitted to the other computing device 242. In response to the other computing device 242 receiving the confirmation data, the other computing device 242 can provide an indication via an output device 246 of the other computing device 242. The indication can confirm to the user that their authorization was accepted, and that the restriction responding to the recent notification will be bypassed for that notification. Alternatively, and/or additionally, the contextual engine 230 can determine a context in which the user provided authorization, and permit the restriction to be bypassed so long as the context does not change. For example, if the user is riding to a particular destination and/or is riding with one or more particular passengers, the destination and/or the passengers can be characterized as a particular context. Therefore, when the user is leaving the particular destination after arriving, and/or the passengers leave the vehicle, or a different passenger enters the vehicle, the restriction can be enforced again, at least until a separate authorization is provided by the user.

Figure 3A:
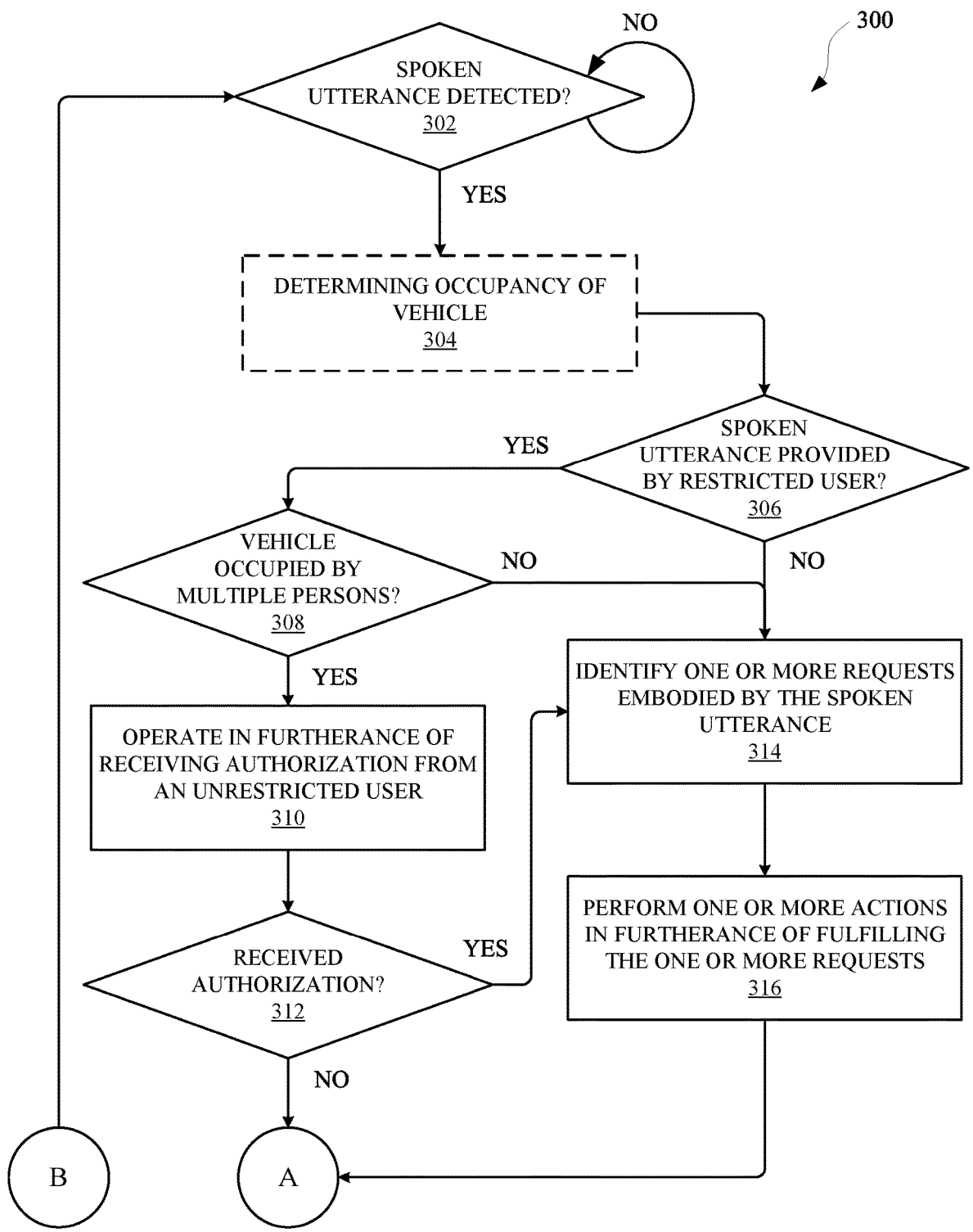
FIG. 3A and FIG. 3B illustrate methods for establishing and enforcing access restrictions for an automated assistant based on one or more different factors.
Figure 3B:
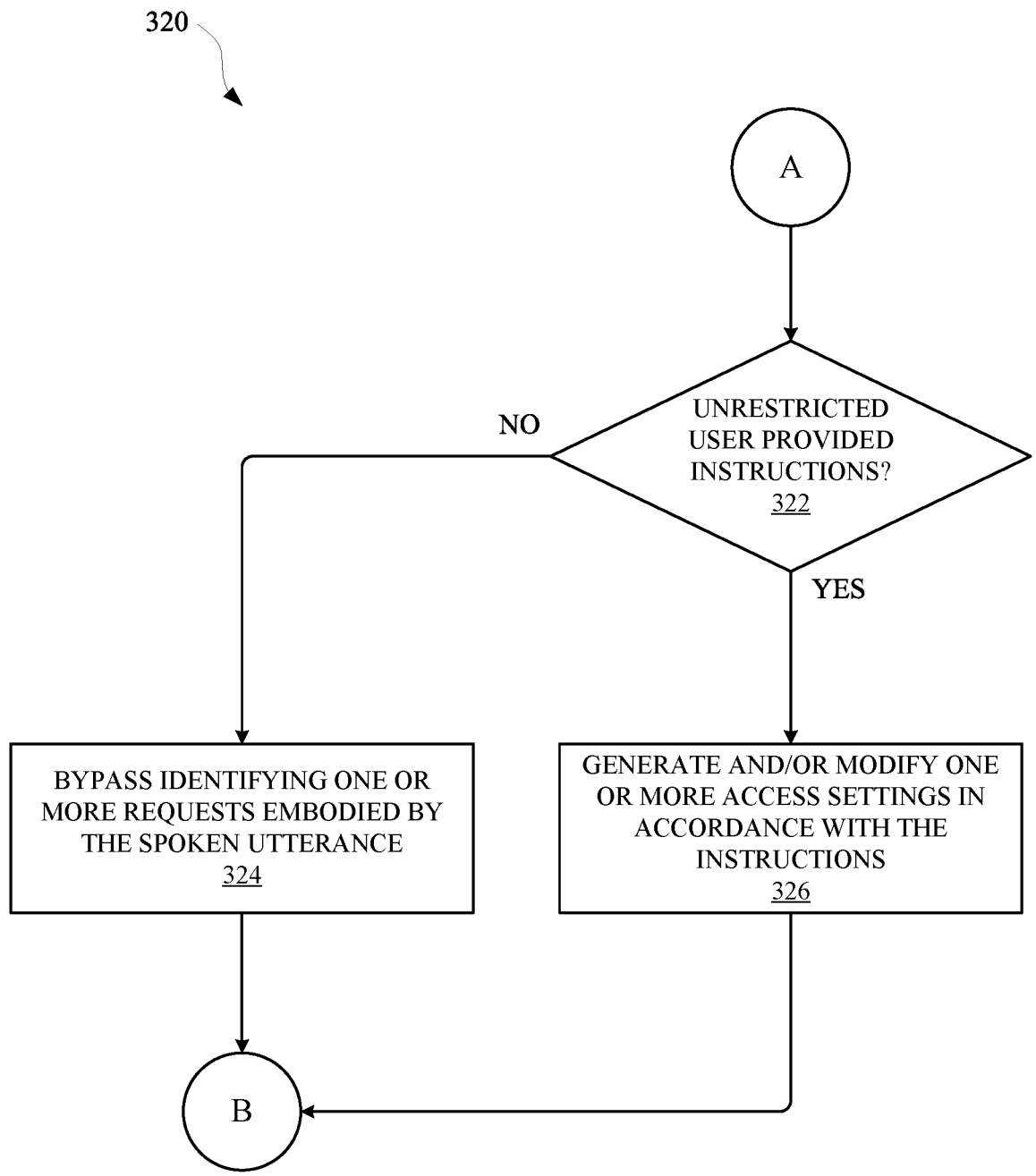

FIG. 3A and FIG. 3B illustrate method 300 and method 320 for establishing and enforcing access restrictions for an automated assistant based on one or more different factors. The method 300 and the method 320 can be performed by one or more computing devices, applications, and/or any other apparatus or module capable of providing access to an automated assistant. The method 300 can include an operation 302 of determining whether a spoken utterance was detected at an automated assistant interface of a computing device. In some implementations, the automated assistant interface can be connected to a vehicle computing device that is located within and/or otherwise attached to a vehicle. One or more passengers of the vehicle can interact with the automated assistant via the vehicle computing device using one or more different inputs provided to one or more different input modalities available within the vehicle. The vehicle can be one that is owned by a user who also owns multiple different computing devices through which an automated assistant is accessible. Alternatively, the vehicle can be owned by a third party entity that allows users to operate the vehicle through a paid service. Alternatively, or additionally, the vehicle can be employed by user for conducting ride-sharing activities, which can be tracked by an application that is accessible via the vehicle computing device and/or a separate computing device owned by the user.

The method 300 can further include an optional operation 304 of determining occupancy of the vehicle. Occupancy can refer to a number of persons that are located within the vehicle, and/or riding in the vehicle. Occupancy can be determined based on one or more sensor outputs of one or more sensors that are responsive to environmental changes within the vehicle. Therefore, as one or more persons enter and/or exit the vehicle, occupancy can change and be characterized by the one or more sensor outputs. The sensors can be in communication with the vehicle computing device and/or a remote server device, that is also in communication with the vehicle computing device. Furthermore, permission to determine occupancy can be granted or revoked by a user that owns the vehicle and/or any other passenger that occupies the vehicle.

The method 300 can further include an operation 306 of determining whether the spoken utterance was provided by a restricted user. A restricted user can be a person that interacts with the automated assistant but is not permitted to access restricted data via the automated assistant. For example, when a passenger of a vehicle that is owned by a user provides the spoken utterance, the passenger can be considered a restricted user because the passenger does not own the vehicle. Alternatively, or additionally, the passenger can be a restricted user because the passenger is not listed on an account that is accessible via, or otherwise associated with, the vehicle computing device.

When the spoken utterance is not provided by a restricted user, or otherwise provided by an unrestricted at user, the method 300 can proceed from the operation 306 to the operation 314. The operation 314 can include identifying one or more requests embodied by the spoken utterance. For example, audio data corresponding to the spoken utterance can be processed at the vehicle computing device and/or a server device in order to determine natural language understanding of the spoken utterance. Data characterizing the natural language understanding can be further processed to identify one or more requests that are embodied in the spoken utterance. For example, content of the spoken utterance can correspond to a request for the automated assistant to perform one or more actions, one or more routines, and/or any other operation capable of being performed by the automated assistant.

When the spoken utterance is provided by a restricted user, the method 300 can proceed from the operation 306 to the operation 308. The operation 308 can include determining whether the vehicle is occupied by multiple persons. In some implementations, determining whether the vehicle is occupied by multiple persons can be based on the occupancy determined at the operation 304. Alternatively, or additionally, determining whether the vehicle is occupied by multiple persons can be determined using other information, such as voice characteristics of one or more persons within the vehicle, client data provided via one or more client devices being carried by one or more persons within the vehicle, schedule data corresponding to one or more persons and indicating whether the one or more persons plan on riding in the vehicle, and/or any other information that can be used to determine occupancy of a vehicle.

When the vehicle is not occupied by multiple persons, the method 300 can proceed from the operation 308 to the operation 314. When the vehicle is occupied by multiple persons, the method 300 can proceed from the operation 308 to the operation 310. The operation 310 can include operating in furtherance of receiving authorization from an unrestricted user. The unrestricted user can be one that is associated with data that will be accessed in order to fulfill one or more requests that have been provided via the detected spoken utterance. Alternatively, or additionally, the unrestricted user can be one that is permitted to access restricted data that the user who provided the spoken utterance is attempting to access. In some implementations the operation 310 can include causing the vehicle computing device to await authorization from the unrestricted user. Alternatively, or additionally, the operation 310 can include causing the vehicle computing device to render a prompt that requests the authorization from the unrestricted user.

The method 300 can proceed from the operation 310 to the operation 312, which can include determining whether authorization was received from the unrestricted user. When authorization is received from the unrestricted user, the method 300 can proceed from the operation 312 to the operation 314. When the operation 314 is completed, the method 300 can proceed from the operation 314 to the operation 316. The operation 316 can include performing one or more actions in furtherance of fulfilling the one or more requests. For instance, a restricted user can provide the spoken utterance, and the spoken utterance can embody a request for the automated assistant to perform a routine including multiple different actions. Therefore, when authorization is received at the operation 312, and the request to perform the routine is identified at the operation 314, the automated assistant can operate in furtherance of executing the one or more actions for filling the request to perform the routine.

When authorization is not received, and/or when one or more actions have been completed, the method 300 can proceed from continuation element "A" to the method 320, at operation 322. In other words, continuation element A links the method 300 to the method 320, as illustrated in FIG. 3A and FIG. 3B. In FIG. 3B, the method 320 can proceed from the continuation element "A" to the operation 322. The operation 322 can include determining whether an unrestricted user provided other instructions. The other instructions can include, but are not limited to one or more requests for setting restrictions on access to services, data, and/or any other feature that can be accessed via the vehicle computing device, and/or any other computing device associated with the unrestricted user. For example, if the unrestricted user did not provide authorization, the unrestricted user can nonetheless provide one or more requests for other restrictions to be enforced. Such restrictions can be based on context, types of request, particular users making the request, and/or any other property that can be associated with interactions with an automated assistant.

When the unrestricted user is determined to have provided other instructions, the method 320 can proceed from the operation 322 to the operation 326. The operation 326 can include modifying one or more access settings in accordance with the other instructions. When the unrestricted user is determined to have not provided other instructions, the method 320 can proceed from the operation 322 to the operation 324. The operation 324 can include bypassing identifying one or more requests embodied in the spoken utterance. In other words, because the user who provided the one of my request was not authorized to make such requests, the method 320 can include bypassing further processing of the spoken utterance, and/or subsequent inputs, from the user. The method 320 can proceed from the operation 324 and/or the operation 326, via continuation element "B," to operation 302. As illustrated in FIG. 3B and FIG. 3A, the continuation element "B" can provide a link between the method 320 and the method 300. Furthermore, and via continuation element "B," the method 320 can return to determining whether a subsequent spoken utterance has been received at the operation 302.

Figure 4:
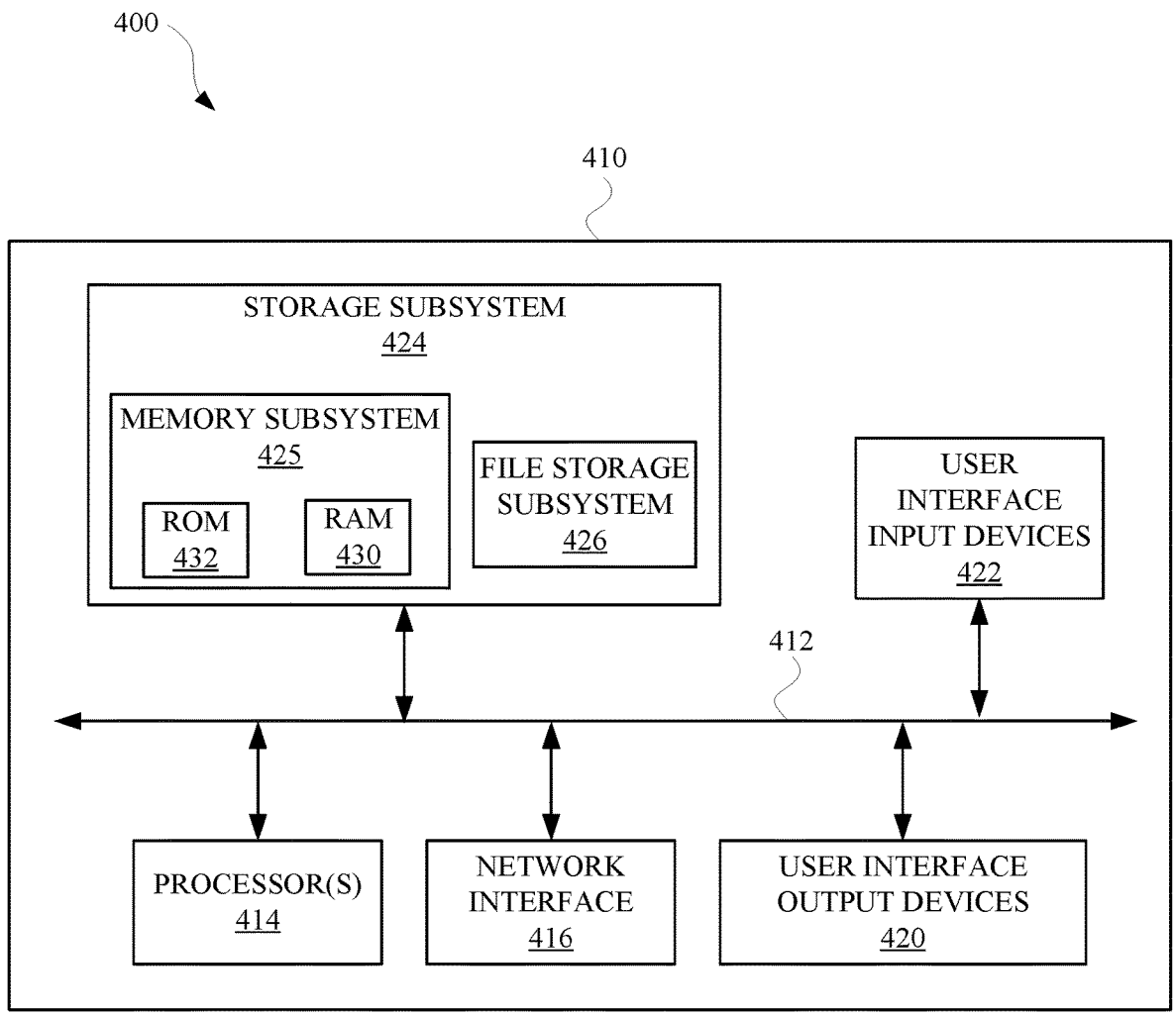
FIG. 4 is a block diagram of an example computer system.

FIG. 4 is a block diagram of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300 and method 320, and/or to implement one or more of computing device 114, vehicle 112, server device 126, system 200, server device 202, computing device 218, other computing device 242, and/or any other apparatus, module, and/or engine discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is set forth as including operations such as receiving, from a vehicle computing device, input data in response to a spoken utterance received at an automated assistant interface of a vehicle computing device, wherein the vehicle computing device is located in a vehicle with a first user and a second user. The method can further include determining, in furtherance of responding to the spoken utterance, whether an assistant invocation task was performed by the second user to overcome a restriction on access, by the first user, to restricted data that is otherwise accessible to the second user via the automated assistant, wherein the vehicle computing device causes the automated assistant to be invoked in response to the second user performing one or more assistant invocation tasks that include the assistant invocation task. The method can further include, when the assistant invocation task was not performed by the second user: causing, in response to determining that the assistant invocation task was not performed by the second user, the vehicle computing device to operate in furtherance of receiving, from the second user, authorization to render output that is based on the restricted data, wherein the second user provides authorization to render the output by performing a particular assistant invocation task of the one or more assistant invocation tasks. The method can further include determining, subsequent to causing the vehicle computing device to operate in furtherance of receiving authorization to render the output, whether authorization was received from the second user. The method can further include, when authorization is determined to have been received from the second user: causing the vehicle computing device to render the output that is based on the restricted data and the input data.

In some implementations, the method can further include, prior to causing the vehicle computing device to render the output: determining an occupancy of the vehicle based on vehicle data that is accessible to the vehicle computing device. In some implementations, the method can further include causing, based on the occupancy, the automated assistant and/or the vehicle computing device to operate according to an operating mode, selected from two or more operating modes. In some implementations, determining whether the assistant invocation task was performed by the second user is executed responsive to the vehicle computing device being in the operating mode. In some implementations, the vehicle data is based on output from one or more sensors that are connected to the vehicle and are responsive to changes in occupancy of the vehicle. In some implementations, the vehicle data is provided by an application that is accessible via the vehicle computing device, and the vehicle data indicates whether occupancy within the vehicle is in furtherance of a ride-sharing activity. In some implementations, the method can further include, when the assistant invocation task is performed by the second user: providing, based on the second user performing the assistant invocation task, access to the restricted data via the vehicle computing device, and causing the vehicle computing device to render the output that is based on the restricted data.

In some implementations, determining whether authorization was received from the second user includes: determining whether the second user provided a separate spoken utterance to the automated assistant interface and/or whether the second user provided an input to a separate interface that is connected to the vehicle computing device. In some implementations, the method can further include, when the authorization is determined to have not been received from the second user: causing the vehicle computing device to render a separate output that indicates a restriction of the automated assistant for responding to the spoken utterance. In some implementations, the method can further include, when the authorization is determined to have not been received from the second user: generating responsive data that characterizes a request for the second user to provide another spoken utterance that is different from the spoken utterance previously provided by the first user, and causing the vehicle computing device to render the request to the second user. In some implementations, the method can further include, when the authorization is determined to have not been received from the second user: determining that the second user has provided a limitation request to the automated assistant, wherein the limitation request specifies one or more limitations on interactions between the first user and the automated assistant, and generating, in response to determining that the second user has provided the limitation request to the automated assistant, restriction data that characterizes the one or more limitations on interactions between the first user and the automated assistant.

In some implementations, the one or more limitations characterized by the restriction data includes a limitation on accessibility of the automated assistant to the first user during a current route through which the vehicle is driving, or until the vehicle arrives at a particular destination. In some implementations, the one or more limitations characterized by the restriction data include a limitation on accessibility to one or more types of data to the first user during a current route through which the vehicle is traveling, or until the vehicle arrives at a particular destination. In some implementations, the one or more limitations characterized by the restriction data includes a limitation on one or more types of commands that the automated assistant can be responsive to when the one or more types of commands are provided by the first user during a current route through which the vehicle is traveling, or until the vehicle arrives at a particular destination. In some implementations, the input data characterizes a request for the automated assistant to perform an automated assistant routine, which corresponds to two or more action that are performed by the automated assistant in response to one or more users providing the request to the automated assistant interface.

In some implementation, first responsive data and second responsive data are generated in response to the automated assistant initializing performance of a first action of the two or more actions corresponding to the automated assistant routine. Furthermore, the method can further include, subsequent to causing the vehicle computing device to render the output: causing the vehicle computing device to render a separate output according to a second action of the two or more actions in furtherance of completing the automated assistant routine. In some implementations, the method can further include: generating responsive data based on the input data, and, when the assistant invocation task is determined to have been performed by the second user: causing the vehicle computing device to render the separate output using the responsive data.

In other implementations, a method implemented by one or more processors is set forth as including operations such as processing input data corresponding to a spoken utterance that is received at an automated assistant interface of a vehicle computing device, wherein the vehicle computing device is located within a vehicle and the spoken utterance was received when the vehicle is traveling to reach a destination. The method can further include determining, while the vehicle is traveling to reach the destination, an occupancy of the vehicle, wherein the occupancy is determined based on output of one or more sensors that are in communication with the vehicle computing device. The method can further include determining, based on processing the input data, whether the spoken utterance includes a request for the automated assistant to perform at least one action that involves accessing restricted data that is accessible to an unrestricted user via the vehicle computing device. The method can further include determining, based on the occupancy of the vehicle, whether the vehicle is currently occupied by the unrestricted user. The method can further include, when the spoken utterance includes the request for the automated assistant to perform at least one action that involves accessing the restricted data and the vehicle is occupied by the unrestricted user: operating in furtherance of receiving authorization from the unrestricted user. In some implementations, the method can further include, when the authorization is received from the unrestricted user via an authorization input to the vehicle computing device and/or another computing device: causing the automated assistant to perform at least the one action that involves accessing the restricted data. In some implementations, the method can further include when the spoken utterance includes the request for the automated assistant to perform at least one action that involves accessing the restricted data and the vehicle is not occupied by the unrestricted user: identifying at least one other action that does not involve accessing the restricted data, and causing the automated assistant to perform the at least one other action in furtherance of fulfilling the request.

In some implementations, the method can further include, when the spoken utterance includes the request for the automated assistant to perform at least one action that involves accessing the restricted data and the vehicle is occupied by the unrestricted user, and when the authorization is not received from the user via the vehicle computing device and/or another computing device: identifying at least the one other action that does not involve accessing the restricted data, and causing the automated assistant to perform the at least one other action in furtherance of fulfilling the request. In some implementations, identifying the at least one other action includes identifying a particular action that involves accessing unrestricted data, and the requests is a routine request that corresponds to an automated assistant routine that involves two or more actions being performed by the automated assistant.

In yet other implementations, a method implemented by one or more processors is set forth as including operations such as processing input data corresponding to a spoken utterance that is received at an automated assistant interface of a vehicle computing device, wherein the vehicle computing device is located within a vehicle and the spoken utterance is received from a user when the vehicle was traveling to reach a destination. In some implementations, the method can further include determining, based on processing the input and while the vehicle is traveling to reach the destination, whether restriction data accessible to the vehicle computing device characterizes a contextual restriction that corresponds to a current context in which the spoken utterance was received at the automated assistant interface. In some implementations, the method can further include, when the restriction data does not characterize the contextual restriction that corresponds to the current context in which the spoken utterance was received: causing the automated assistant to operate in furtherance of fulfilling one or more requests specified by the user via the spoken utterance. In some implementations, the method can further include, when the restriction data characterizes the contextual restriction that corresponds to the current context in which the spoken utterance was received: determining whether an authorization input was received from an unrestricted user for authorizing the automated assistant to operate in furtherance of fulfilling one or more requests specified via the spoken utterance. In some implementations, the method can further include, when the authorization input is determined to have not been received from the unrestricted user: causing the automated assistant to deny access to restricted data for the user.

In some implementations, wherein determining whether the authorization input was received from the unrestricted user includes: determining whether a touch input was received at an interface of the vehicle computing device by the unrestricted user, wherein the interface of the vehicle computing device is located within the vehicle.

In yet other implementations, a method implemented by one or more processors is set forth as including operations such as processing input data corresponding to a spoken utterance that is received at an automated assistant interface of a vehicle computing device, wherein the vehicle computing device is located within a vehicle and the spoken utterance is received from a user when the vehicle was traveling to reach a destination. The method can further include determining, based on processing the input and while the vehicle is traveling to reach the destination, whether restriction data accessible to the vehicle computing device characterizes a contextual restriction that corresponds to a current context in which the spoken utterance was received at the automated assistant interface. The method can further include, when the restriction data characterizes the contextual restriction that corresponds to the current context in which the spoken utterance was received: determining whether an authorization input was received from an unrestricted user for authorizing the automated assistant to operate in furtherance of fulfilling one or more requests specified via the spoken utterance. In some implementations, the method can further include, when the authorization input is determined to have been received from the unrestricted user: causing the automated assistant to operate in furtherance of fulfilling the one or more requests specified via the spoken utterance.

In some implementations, the method can further include, when the restriction data characterizes the contextual restriction that corresponds to the current context in which the spoken utterance was received, and when the authorization input is determined to have been received from the unrestricted user: causing the automated assistant to operate to allow access, by the user, to the restricted data while at least the current context satisfies the contextual restriction. In some implementations, the method can further include, when the restriction data characterizes the contextual restriction that corresponds to the current context in which the spoken utterance was received, and when the authorization input is determined to have been received from the unrestricted user: causing the automated assistant to be responsive to one or more subsequent spoken utterances from the user while at least the current context satisfies the contextual restriction, wherein the automated assistant accesses the restricted data in response to the one or more spoken utterances from the user.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:

1. A method implemented by one or more processors, the method comprising:
   receiving, from a vehicle computing device, input data in response to a spoken utterance received at an automated assistant interface of the vehicle computing device, wherein the vehicle computing device is located in a vehicle with a first user and a second user;
   determining, in furtherance of responding to the spoken utterance, whether an assistant invocation task was performed by the second user to overcome a restriction on access, by the first user, to restricted data that is otherwise accessible to the second user via an automated assistant,
      wherein the vehicle computing device causes the automated assistant to be invoked in response to the second user performing one or more assistant invocation tasks that include the assistant invocation task;
   when the assistant invocation task was not performed by the second user:
      causing, in response to determining that the assistant invocation task was not performed by the second user, the vehicle computing device to operate in furtherance of receiving, from the second user, authorization to render output that is based on the restricted data,
         wherein the second user provides authorization to render the output by performing a particular assistant invocation task of the one or more assistant invocation tasks,
      determining, subsequent to causing the vehicle computing device to operate in furtherance of receiving authorization to render the output, whether authorization was received from the second user;
      when authorization is determined to have been received from the second user:
         causing the vehicle computing device to render the output that is based on the restricted data and the input data; and
      when the authorization is determined to have not been received from the second user:
         determining that the second user has provided a limitation request to the automated assistant, wherein the limitation request specifies one or more limitations on interactions between the first user and the automated assistant, and
         generating, in response to determining that the second user has provided the limitation request to the automated assistant, restriction data that characterizes the one or more limitations on interactions between the first user and the automated assistant, wherein the one or more limitations characterized by the restriction data include a limitation on accessibility of the automated assistant to the first user during a current route through which the vehicle is driving, or until the vehicle arrives at a particular destination.

2. The method of claim 1, further comprising:
   prior to causing the vehicle computing device to render the output:
   determining an occupancy of the vehicle based on vehicle data that is accessible to the vehicle computing device; and
   causing, based on the occupancy, the automated assistant and/or the vehicle computing device to operate according to an operating mode, selected from two or more operating modes,
      wherein determining whether the assistant invocation task was performed by the second user is executed responsive to the vehicle computing device being in the operating mode.

3. The method of claim 2, wherein the vehicle data is based on output from one or more sensors that are connected to the vehicle and are responsive to changes in occupancy of the vehicle.

4. The method of claim 2, wherein the vehicle data is provided by an application that is accessible via the vehicle computing device, and the vehicle data indicates whether occupancy within the vehicle is in furtherance of a ride-sharing activity.

5. The method of claim 1, further comprising:
   when the assistant invocation task is performed by the second user:

providing, based on the second user performing the assistant invocation task, access to the restricted data via the vehicle computing device, and causing the vehicle computing device to render the output that is based on the restricted data.

6. The method of claim 1, further comprising, wherein determining whether authorization was received from the second user includes:

determining whether the second user provided a separate spoken utterance to the automated assistant interface and/or whether the second user provided an input to a separate interface that is connected to the vehicle computing device.

7. The method of claim 1, further comprising:

when the authorization is determined to have not been received from the second user:

causing the vehicle computing device to render a separate output that indicates a particular restriction of the automated assistant for responding to the spoken utterance.

8. The method of claim 7, further comprising:

when the authorization is determined to have not been received from the second user:

generating responsive data that characterizes a request for the second user to provide another spoken utterance that is different from the spoken utterance previously provided by the first user, and causing the vehicle computing device to render the request to the second user.

9. The method of claim 1, wherein the one or more limitations characterized by the restriction data further include a limitation on accessibility to one or more types of data to the first user during a current route through which the vehicle is traveling, or until the vehicle arrives at a particular destination.

10. The method of claim 1, wherein the one or more limitations characterized by the restriction data further include a limitation on one or more types of commands that the automated assistant can be responsive to when the one or more types of commands are provided by the first user during a current route through which the vehicle is traveling, or until the vehicle arrives at a particular destination.

11. The method of claim 1, wherein the input data characterizes a request for the automated assistant to perform an automated assistant routine, which corresponds to two or more actions that are performed by the automated assistant in response to one or more users providing the request to the automated assistant interface.

12. The method of claim 11, wherein first responsive data and second responsive data are generated in response to the automated assistant initializing performance of a first action of the two or more actions corresponding to the automated assistant routine, and wherein the method further comprises:

subsequent to causing the vehicle computing device to render the output:

causing the vehicle computing device to render a separate output according to a second action of the two or more actions in furtherance of completing the automated assistant routine.

13. The method of claim 12, further comprising:

generating responsive data based on the input data; and when the assistant invocation task is determined to have been performed by the second user:

causing the vehicle computing device to render the separate output using the responsive data.

14. A method implemented by one or more processors, the method comprising:

processing input data corresponding to a spoken utterance that is received at an automated assistant interface of a vehicle computing device, wherein the vehicle computing device is located within a vehicle and the spoken utterance was received when the vehicle is traveling to reach a destination;

determining, while the vehicle is traveling to reach the destination, an occupancy of the vehicle, wherein the occupancy is determined based on output of one or more sensors that are in communication with the vehicle computing device;

determining, based on processing the input data, whether the spoken utterance includes a request for an automated assistant to perform at least one action that involves accessing restricted data that is accessible to an unrestricted user via the vehicle computing device;

determining, based on the occupancy of the vehicle, whether the vehicle is currently occupied by the unrestricted user;

when the spoken utterance includes the request for the automated assistant to perform at least one action that involves accessing the restricted data and the vehicle is occupied by the unrestricted user:

operating in furtherance of receiving authorization from the unrestricted user, and when the authorization is received from the unrestricted user via an authorization input to the vehicle computing device and/or another computing device:

causing the automated assistant to perform at least the one action that involves accessing the restricted data;

when the authorization is determined to have not been received from the unrestricted user:

determining that the unrestricted user has provided a limitation request to the automated assistant, wherein the limitation request specifies one or more limitations on interactions between with the automated assistant, and generating, in response to determining that the unrestricted user has provided the limitation request to the automated assistant, restriction data that characterizes the one or more limitations on interactions with the automated assistant, wherein the one or more limitations characterized by the restriction data include a limitation on accessibility of the automated assistant during a current route through which the vehicle is driving, or until the vehicle arrives at a particular destination, and when the spoken utterance includes the request for the automated assistant to perform at least one action that involves accessing the restricted data and the vehicle is not occupied by the unrestricted user:

identifying at least one other action that does not involve accessing the restricted data, and causing the automated assistant to perform the at least one other action in furtherance of fulfilling the request.

15. The method of claim 14, further comprising:

when the spoken utterance includes the request for the automated assistant to perform at least one action that involves accessing the restricted data and the vehicle is occupied by the unrestricted user, and when the authorization is not received from the unrestricted user via the vehicle computing device and/or another computing device:
identifying at least the one other action that does not involve accessing the restricted data, and
causing the automated assistant to perform the at least one other action in furtherance of fulfilling the request.

16. The method of claim 14,
wherein identifying the at least one other action includes identifying a particular action that involves accessing unrestricted data, and
wherein the request is a routine request that corresponds to an automated assistant routine that involves two or more actions being performed by the automated assistant.

17. A method implemented by one or more processors, the method comprising:
processing input data corresponding to a spoken utterance that is received at an automated assistant interface of a vehicle computing device, wherein the vehicle computing device is located within a vehicle and the spoken utterance is received from a user when the vehicle was traveling to reach a destination;
determining, based on processing the input data and while the vehicle is traveling to reach the destination, whether restriction data accessible to the vehicle computing device characterizes a contextual restriction that corresponds to a current context in which the spoken utterance was received at the automated assistant interface, wherein the contextual restriction includes one or more of:
a limitation on accessibility to one or more types of data to the user during a current route through which the vehicle is traveling, or until the vehicle arrives at the destination, or
a limitation on one or more types of commands that the automated assistant can be responsive to when the one or more types of commands are provided by the user during a current route through which the vehicle is traveling, or until the vehicle arrives at the destination;
when the restriction data does not characterize the contextual restriction that corresponds to the current context in which the spoken utterance was received:
causing an automated assistant to operate in furtherance of fulfilling one or more requests specified by the user via the spoken utterance; and
when the restriction data characterizes the contextual restriction that corresponds to the current context in which the spoken utterance was received:
determining whether an authorization input was received from an unrestricted user for authorizing the automated assistant to operate in furtherance of fulfilling one or more requests specified via the spoken utterance, and
when the authorization input is determined to have not been received from the unrestricted user:
causing the automated assistant to deny access to restricted data for the user.

18. The method of claim 17, wherein determining whether the authorization input was received from the unrestricted user includes:
determining whether a touch input was received at an interface of the vehicle computing device by the unrestricted user, wherein the interface of the vehicle computing device is located within the vehicle.

* * * * *